(12) United States Patent
Chadha et al.

(10) Patent No.: US 6,604,206 B2
(45) Date of Patent: Aug. 5, 2003

(54) REDUCED GMII WITH INTERNAL TIMING COMPENSATION

(75) Inventors: Mandeep Singh Chadha, Austin, TX (US); Marty Lynn Pflum, Austin, TX (US); Nicholas van Bavel, Austin, TX (US)

(73) Assignee: Cicada Semiconductor Corporation, Austin, TX (US)

( * ) Notice: Subject to any disclaimer, the term of this patent is extended or adjusted under 35 U.S.C. 154(b) by 220 days.

(21) Appl. No.: 09/870,394

(22) Filed: May 30, 2001

(65) Prior Publication Data

US 2002/0184550 A1 Dec. 5, 2002

(51) Int. Cl.[7] ................................ G06F 1/12
(52) U.S. Cl. ..................................... 713/401
(58) Field of Search ................... 713/400, 401, 713/600, 503; 710/58, 60, 61

(56) References Cited

U.S. PATENT DOCUMENTS

| | | |
|---|---|---|
| 4,415,984 A | 11/1983 | Gryger et al. |
| 5,737,589 A | 4/1998 | Doi et al. |
| 5,870,594 A | 2/1999 | Doi et al. |
| 6,047,021 A | 4/2000 | Grimes et al. |
| 6,108,794 A | 8/2000 | Erickson |
| 6,345,328 B1 | 2/2002 | Rozario et al. |

Primary Examiner—Thomas M. Heckler
(74) Attorney, Agent, or Firm—Gregory M. Howison; Howison & Arnott, LLP

(57) ABSTRACT

Reduced GMII with internal timing compensation A data interface between first and second integrated circuits. An internal clock signal is generated internal to the first integrated circuit and operates in a first frequency. A data generator is provided for generating data from at least one edge of the internal clock for transmission to the second integrated circuit. a first delay block internal to the first integrated circuit delays the internal clock for a predetermined duration of time less than one-half clock cycle of said internal clock to provide a first delayed clock. The second integrated circuit is then operable to receive the transmitted first delayed clock and utilize the transmitted first delayed clock to sample the received data generated by the data generator.

51 Claims, 7 Drawing Sheets

REDUCED GMII WITH INTERNAL TIMING COMPENSATION

TECHNICAL FIELD OF THE INVENTION

The present invention pertains in general to a Gigabit Media Independent Interface (GMII) with a reduced pin count interface for the physical layer of devices and, more particularly, to the timing considerations for transferring data between the Physical Layers Devices (PHY) and the Media Access Controller (MAC).

BACKGROUND OF THE INVENTION

In high speed ethernet controllers, such as the gigabit ethernet controllers, data is transferred at relatively high rates. In one instantiation, the driver/receiver circuitry is contained within a physical layer device (PHY) with media access control being contained within a Media Access Control (MAC) block. Data is received by the PHY device from the transmission medium and then transmitted to the MAC for a receive operation. During a transmit operation, data is transferred from the MAC to the PHY layer and the PHY layer then transmits the data onto the transmission medium. Each of the MAC and PHY blocks have independent clocks such that a data clock is always transmitted with the data. Due to the high data rate in the gigabit controller, some timing compensation is required between the chips to insure that the clock and data are properly aligned at the receiver. The reason for this is that the clock edge of the data clock in the transmitter is utilized to generate data and then is also utilized at the opposite end of the transmission line in the receiver to sample the data. To insure that the sampling is done only during "data valid" windows, the clock is delayed with respect to the data. The typical way that this is done at present is to utilize trombone section transmission lines between the PHY and MAC devices which will introduce a predetermined amount of propagation delay into the signal path. However, this requires the board designer on which the MAC and PHY chips reside to handle the propagation delay problem. Additionally, this requires more board space to accommodate this layout.

SUMMARY OF THE INVENTION

The present invention disclosed and claimed herein, in one aspect thereof, comprises a data interface between first and second integrated circuits. An internal clock signal is generated internal to the first integrated circuit and operates in a first frequency. A data generator is provided for generating data from at least one edge of the internal clock for transmission to the second integrated circuit. A first delay block internal to the first integrated circuit delays the internal clock for a predetermined duration of time substantially equal to one-half clock cycle of the internal clock to provide a first delayed clock. The second integrated circuit is then operable to receive the transmitted first delayed clock and utilize the transmitted first delayed clock to sample the received data generated by the data generator.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
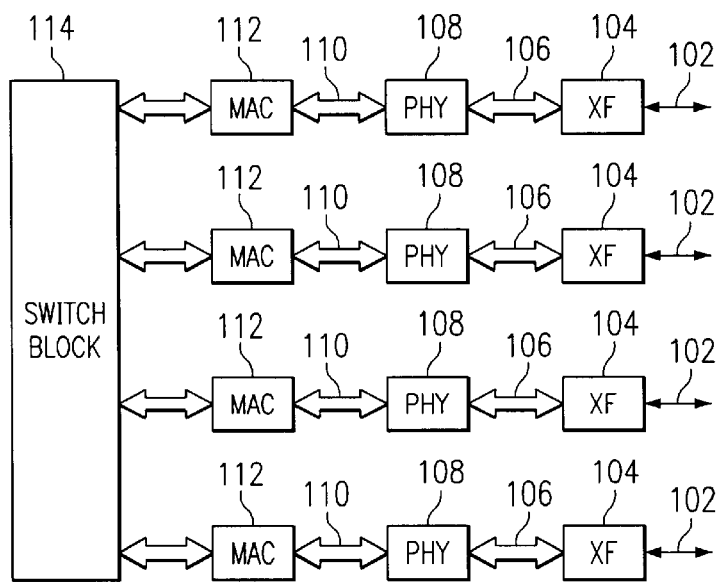
FIG. 1 illustrates an overall diagrammatic view of a switch utilizing the ethernet controller of the present disclosure.

Referring now to FIG. 1, there is illustrated a diagrammatic view of an ethernet controller switch, this including a plurality of input connections 102, all of which are interfaced with a transmission medium of, in the present embodiment, a twisted wire pair, the interface 102 connected to another location, such as a remote station (not shown). Each of the interconnects 102 is interfaced with a transformer block 104, the transformer block 104 interfacing with a transmission medium 106 to the input of a physical layer (PHY) block 108. The physical layer block 108 has contained therein various driver circuitry for driving the transmission medium 106 when data is transmitted, and for receiving from the transmission date 106 with various receivers. The physical layer can condition this receive data and provide it as an output on a second transmission medium 110 for delivery to the Media Access Controller (MAC) block 112.

The PHY 108 and MAC 112 are all associated with operation of an ethernet type controller. This system operates at three potential rates, 10 Mb/s, 100 Mb/s and 1000 Mb/s data rates. In the disclosed embodiment, this system operates on a twisted wire pair (and, therefore, they are referred to as the 10 BASE-T, 100 BASE-T and 1,000 BASE-T controllers). The PHY 108 is operable to receive the data in the appropriate format and then convert it to a format capable of being transmitted to the MAC 112. In the high speed operation, the 1000 BASE-T mode for Gigabit transmission rates, the PHY 106 utilizes fall duplex baseband transmission over four pairs of category five balanced cabling or twisted wire. The aggregate data rate of 1000 Mb/s is achieved by transmission at a data rate of 250 Mb/s over each wire pair. The use of hybrids and cancellers enables full duplex transmission by allowing symbols to be transmitted and received on the same wire pairs at the same time. Baseband signaling with a modulation rate of 125 Mbaud is utilized on each of the wire pairs. The transmitted symbols are selected from a four-dimensional five-level symbol constellation. The details of the interface of the PHY 108 with the transmission media are not illustrated in the present disclosure, but can be found in the IEEE standards for this interface, IEEE Std 802.3 ab-1999.

In the illustration of FIG. 1, there are illustrated four MAC/PHY paths, which allow for interfaces 102 to be connected together. There is provided a switch block 114 for interfacing the MACs 112 for each of the paths. This switch block is basically the interconnect layer that allows information to be transmitted between ports or to be shared between all ports. Other embodiments may use a network interface card (NIC) in conjunction with software on the system containing the NIC to perform the higher level functions.

Figure 2:
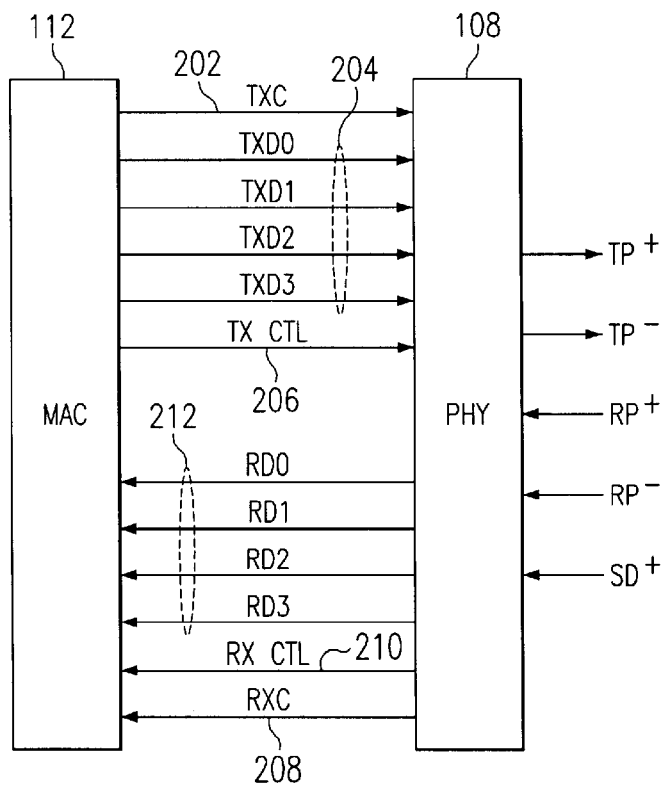
FIG. 2 illustrates a detail of the interface between the MAC and PHY devices.

Referring now to FIG. 2, there is illustrated a detailed diagram of the PHY 108 and MAC 112 interface for a reduced pin-count. Typically, the IEEE standard 802.3ab requires that data be transmitted on each rising clock edge. By utilizing data transmission on the rising edge and the falling edge, the pin-count and the complexity can be reduced for data transfer between the PHY 108 and the MAC 112. In the illustrated embodiment, the number of pins required to interconnect the MAC 112 and the PHY 108 has been reduced from a maximum of 28 pins to 12 pins. This has been accomplished by reducing the data paths and control signals such that control signals can be multiplexed together with both edges of the clocks utilized. In the gigabit operation, clocks operate at 125 MHz and, for the 10/100 operation, the clocks will operate at 2.5 MHz and 25 MHz, respectively. The reduced pin count gigabit media independent interface (RGMII) shares four data path signals with a Reduced Ten Bit Interface (RTBI) (another mode of operation) and shares control functionality with a fifth data signal. There is provided a transmit clock line 202 that carries a clock signal from the MAC 112 to the PHY 108. This clock will be at a rate of 125 MHz, 25 MHz or 2.5 MHz. There are provided four transmit data paths 204 with the first four bits transmitted on the rising edge of the clock and the last four bits on the falling edge of the clock, as will be described hereinbelow. There is provided a transmit control line 206 that is operable to transmit a transmit enable signal (TXEN) on the rising edge of the clock and a logical derivative of the TXEN enable signal on the falling edge of the clock. There is provided a receive clock on a line 208 from the PHY 108 to the MAC 112 which operates at a rate of 125 MHz, 25 MHz or 2.5 MHz. A control signal is transmitted on a line 210 from the PHY 108 to the MAC 112 which provides an RXDV signal on the rising edge and a derivative thereof on the falling edge. Four receive lines 212 are provided for transmitting an eight bit word from the PHY 108 to the MAC 112, the first bits transmitted on the rising edge and the second four bits transmitted on the falling edge.

Figure 3:
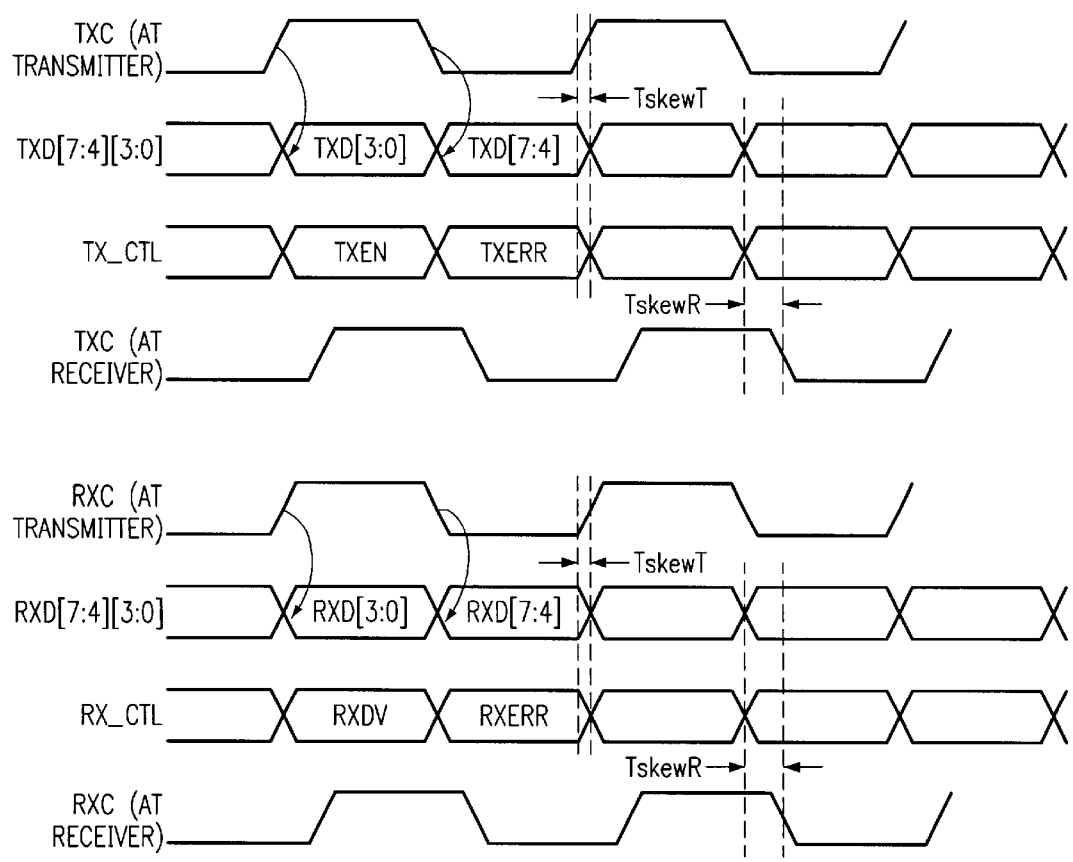
FIG. 3 illustrates the timing diagram for the interface.

Referring now to FIG. 3, there is illustrated a timing diagram for the interface illustrated in FIG. 2. In this timing diagram, it can be seen that the TXEN qualifier generates data that is clocked on the rising and the falling edge. On the rising edge, the first four bits of data are generated and on the falling edge, the second four bits of data are generated. There is provided a skew of approximately +/−500 ps for the transmit operation. At the receiver, the transmit clock is illustrated as requiring that there be a receive skew "TskewR" of approximately 1.8 ns. The receive operation for data transmitter from the PHY 108 to the MAC 112 operates in substantially the same manner. It is noted that TskewR is derived in the prior art by implementing a trace delay through the use of trombone structure, as will be described hereinbelow. The purpose for this delay TskewR is to insure that the rising or falling edge falls within a data valid region of the data to insure that sampling is properly achieved.

Figure 4:
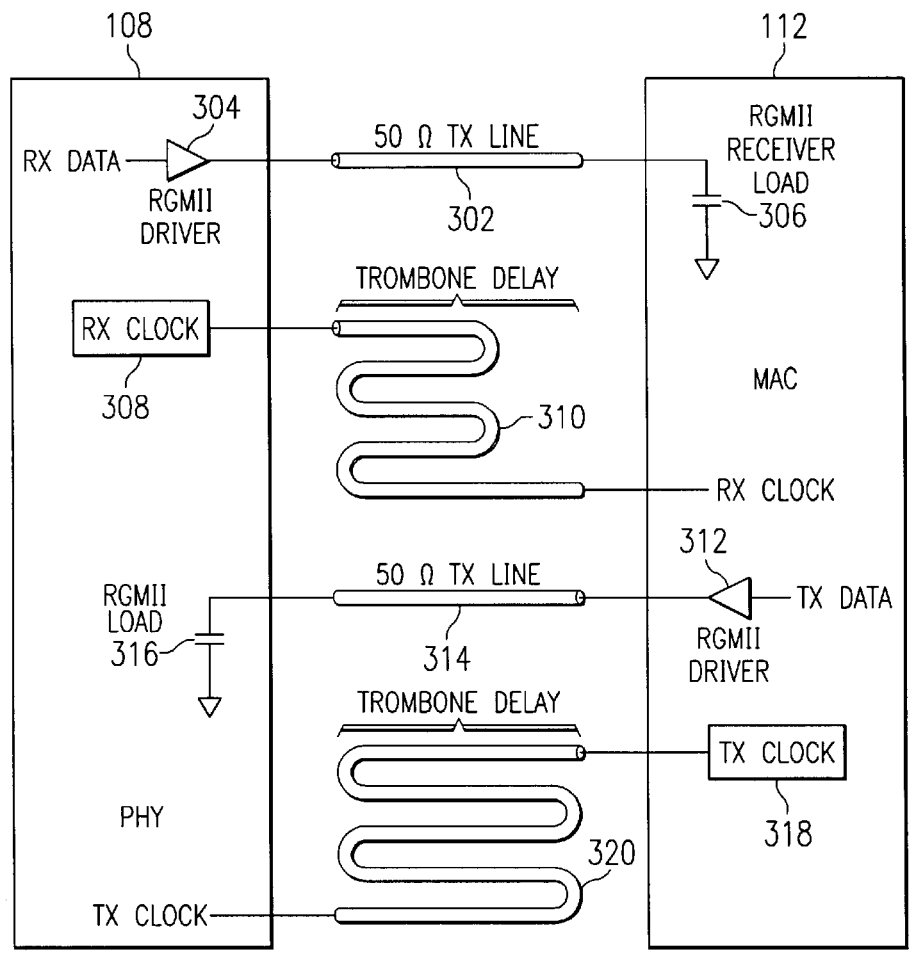
FIG. 4 illustrates a diagrammatic view of the prior art interconnection between transmitted data and received data transferred over the interface.

Referring now to FIG. 4, there is illustrated a detail of the interface between the PHY 108 and the MAC 112 for a prior art system. This illustrates a single data path and a single transmit path. In the single receive path, data is received by the PHY 108 and then transmitted to a transmission line 302 between the PHY 108 and the MAC 112. This is a 50 Ohm transmission line and is driven by an RGMII driver 304. The termination for the data line will be a capacitive termination illustrated by a capacitor 306 in the MAC 112. Although not illustrated, this transmission line 302 will have some type of termination to insure that it has a 50 ohm source impedance. For the receive operation where data is transmitted from the PHY 108 to the MAC 112, a receive clock 308 generates a receive clock signal, which clock signal is utilized to generate the data, and which is transmitted to the MAC 112 through a trombone structure 310 which provides a trace delay, due to the propagation delay through a longer transmission line. This essentially is a 50 ohm transmission line which is longer than the transmission line 302. This provides the receive clock at the MAC 112 with a trace delay associated therewith. In the transmission mode for data being transferred from the MAC 112 to the PHY 108, an RGMII driver 312 is provided for driving a 50 ohm transmission line 314 to provide data to the PHY 108, this being to a capacitive load 316. This is very similar to the transmission line 302 and the driver/load configuration with respect to the receive data. In conjunction with transmission of data from the MAC 112 to the PHY 108, a transmit clock 318 is provided at the MAC 112 for generating the transmit clock. This drives a trombone transmission line 320, which is similar to the trombone transmission line 310. This provides a transmitter clock at the PHY layer 108.

Figure 5:
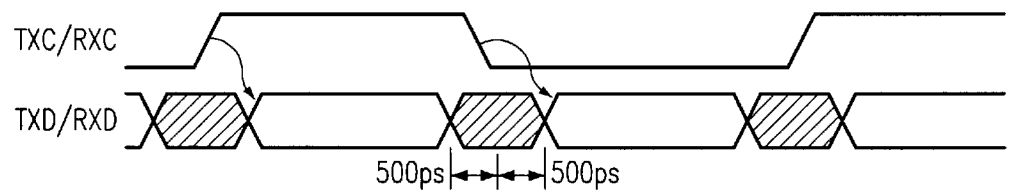
FIG. 5 illustrates the timing diagram for the embodiment of FIG. 4.
Figure 5:
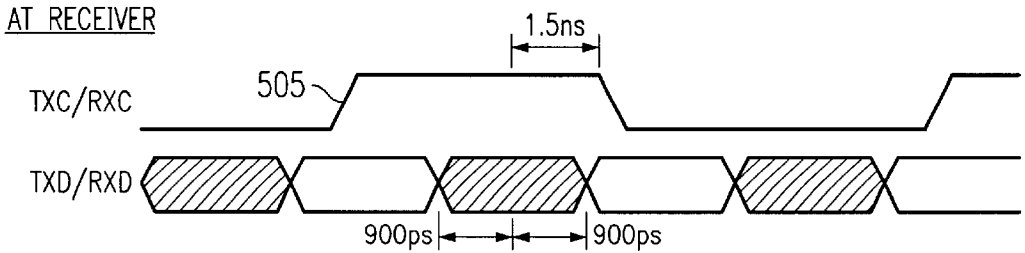

Referring now to FIG. 5, there is illustrated a timing diagram for the prior art system of FIG. 4. It can be seen that, at the transmitter (MAC), that the transmit/receive clocks are both generated at the appropriate MAC/PHY to generate the data. There is provided +/−500 ps skew with respect to the data generated. When this data is received at the receiver, it can be seen that the data skew will increase to +/−900 ps. Therefore, to insure that the clock edge of the clock received at the receiver (it is noted that receiver in this connotation is with respect to one of the PHY 108 or MAC 112 actually receiving a clock signal, either the receive clock or the transmit clock) will be required to be delayed by 1.5 ns. This delay is provided by the trombone structure, as described hereinabove. Since both the PHY 108 and the MAC 112 utilize a trombone structure, both can facilitate the delay with the same clock generators and drivers.

Figure 6:
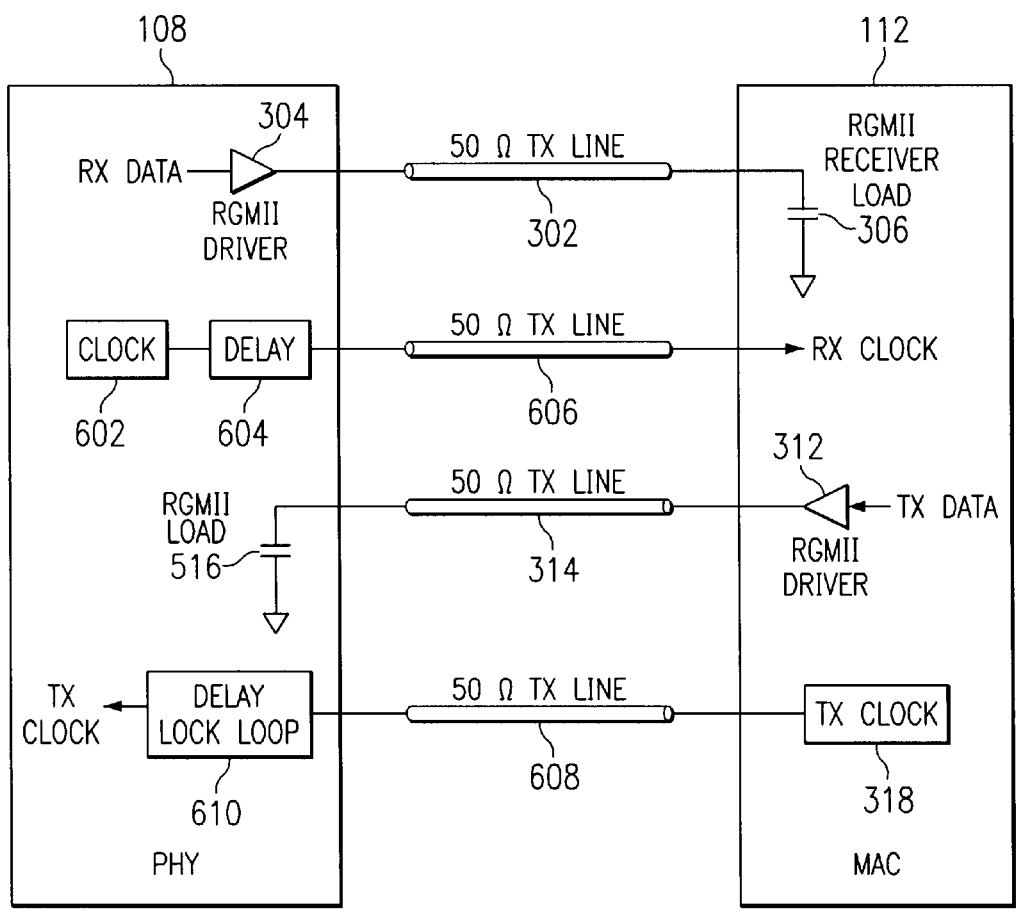
FIG. 6 illustrates a diagrammatic view of the interface for transmit and receive data between the PHY and MAC layers.

Referring now to FIG. 6, there is illustrated a diagram for the interface between the PHY 108 and the MAC 112 of the present disclosure. In the PHY 108, the delay is achieved without the use of a trombone structure; rather, it is achieved with internal timing compensation within the PHY 108. This timing compensation can be utilized for both the receive clock and for the transmit clock, or for either one individually. In the disclosed embodiment, both the delay for the transmit clock and the receive clock are provided for the purpose of eliminating the requirement for any trombone structure to be incorporated on the board design.

In the illustration of FIG. 6, PHY 108 incorporates a receive clock 602 which is then passed through a delay block 604 to delay the clock by approximately 1.8 ns for driving a 50 ohm transmission line 606 similar to the transmission lines 302 and 314. This provides the delayed receive clock at the MAC 112. In the MAC 112, the transmit clock is the same as that described hereinabove with respect to FIG. 4, this being the transmit clock 318. This is operable to drive a 50 ohm transmission line 608, which is similar to transmission lines 302, 314 and 606 in length. This therefore provides an undelayed transmit clock at the input to the PHY 108. To accommodate for this, a delay device 610 is provided at the PHY 108 to insert approximately 1.8 ns of delay into the received transmit clock. Although illustrated as being disposed on the receive side of the transmit clock signal, the delay device 610 could be incorporated in the MAC 112 such that the clock is delayed on the transmit operation at the MAC 112. The transmit clock is then a delayed clock that is received at the PHY 108. Alternately, the delay device 610 could be incorporated at the receiving side in each of the transmit and receive clock signals. Essentially, it should be understood that any combination of the delays, either at the receive end or the transmit end, could be utilized to effect the necessary delay without the need for a trombone structure on the board. Additionally, some of the delay can be provided in one side of the clock generation/receive and some in the other side such that all the delay need not be incorporated in the clock generating side or the receive side.

In the preferred embodiment of the disclosure, all of the timing compensation is incorporated into the PHY 108. In this manner, a conventional MAC 112 can be utilized. Additionally, bypass operations are provided such that the PHY 108 can operate on a board that already incorporates trombone structures such that the internal compensation is not required.

Figure 7A:
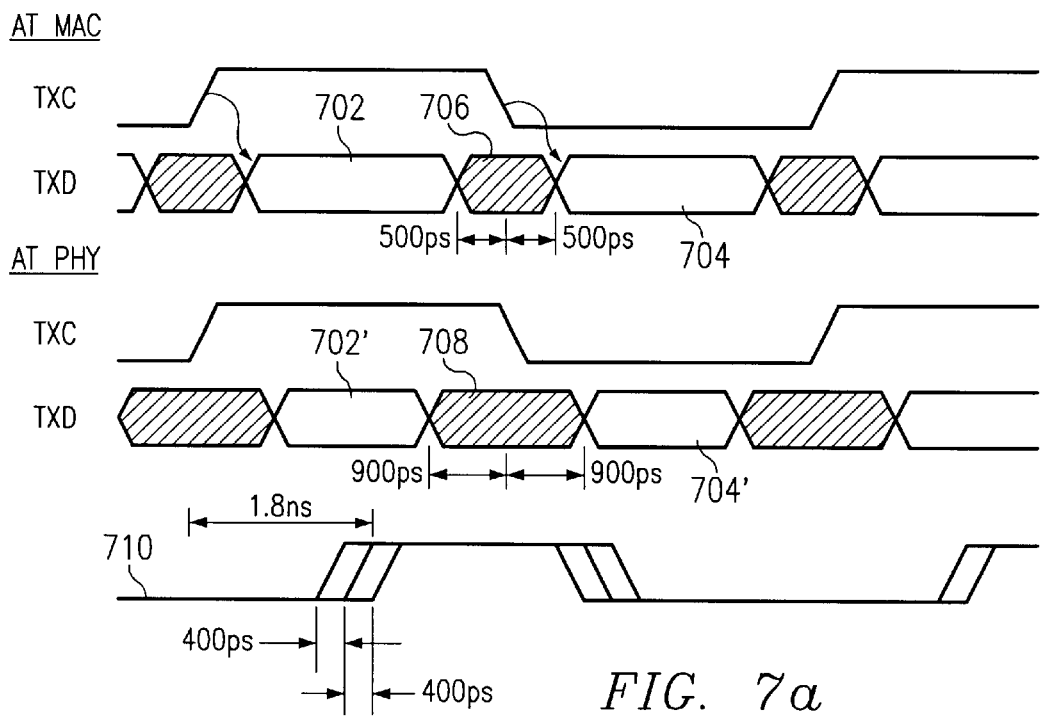
FIGS. 7A and 7B illustrate timing diagrams for the embodiment of FIG. 6.
Figure 7B:
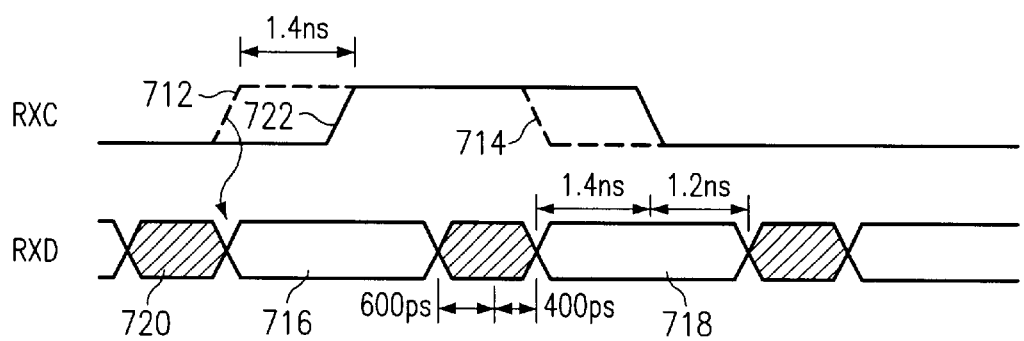

Referring now to FIGS. 7A and 7B, there are illustrated timing diagrams for transfer of data between the PHY 108 and the MAC 112. In FIG. 7A, there is illustrated timing diagrams for the transmit clock generated at the MAC 112 and transmitted to the PHY 108. The transmit clock TXC is generated at the MAC 112 and is operable to generate data TXD, which is comprised of a data field 702 generated on the rising edge of the clock TXC and data field 704 generated on the falling edge of the clock TXC. Each of the data fields 702 and 704 represent the bits [3:0] and [7:4], respectively. At the PHY 108, the TXC is received with no delay. However, the field 702 now has a narrower data valid region as defined by a field 702' and the field 704 is now reduced to a narrower field for the data valid information in a field 704'. This is due to the fact that the initial skew, indicated by a field 706, had a deviation or skew of +/−500 ps (as a result of board layout considerations, i.e., this being board skew), and the receive data at the PHY 108 will have a skew, represented by a field 708, of +/−900 ps. It is therefore necessary to delay the rising edge and falling edge of the clock TXC by 1.8 ns such that it is disposed substantially in the middle of the field 702' and 704' for the later sampling operation of the data. This will result in a delayed clock 710. This delay is effected with the delay block 610, illustrated in FIG. 6.

In FIG. 7B, there is illustrated a diagram of the receive clock that is generated at the PHY 108. The receive data is generated from the edge of an undelayed receive clock, indicated by a rising edge 712 and a falling edge 714 in phantom which will generate a field 716 from the rising edge and a field 718 from the falling edge. This will correspond to the receive data [3:0] and [7:4], respectively. A skew of −500 ps and +500 ps is allowed by the general RGMII specification, as indicated by field 720. The actual generated receive clock RXC is delayed by ½ of the high time of the clock, approximately 2.0 ns or 1.8 ns for a 3.6 ns high time. A delay of 1.4 ns is allowed in the RGMII specification to provide a rising edge 722 substantially in the middle of the generated data field 714, such that when the data field is received at the MAC 112, the clock RXC has the rising edge 722 disposed substantially in the center of the field 716 and the falling edge disposed within substantially the center of the field 718 as received.

Figure 8:
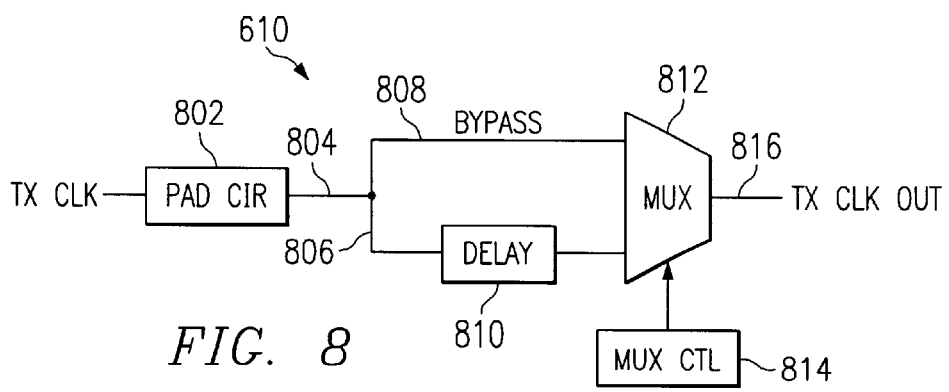
FIG. 8 illustrates a diagram for the clock delay on the transmit clock at the PHY layer.

Referring now to FIG. 8, as illustrated, a diagrammatic view of the delay block 610. The delay block 610 is operable to receive the transmit clock from the transmission line 608 in a PAD circuit block 802, which PAD circuit block includes the various conditioning circuitry to receive the transmitted clock. Once this clock signal has been received, level shifted to the proper level and conditioned, it will be transmitted to a node 804. The node 804 is provided with two paths, a delay path 806 and a bypass path 808. In the delay path 806, the receive clock signal will be processed through a delay block 810 and then input to one input of a multiplexer 812. The other end of the multiplexer 812 receives the bypass path 808. When operating in the RGMII mode with internal timing compensation enabled, the delay path is selected, whereas other modes utilize the bypass path 808. This is selected by a multiplexer control block 814. This then provides a delayed transmitter clock out on a line 816.

Figure 9:
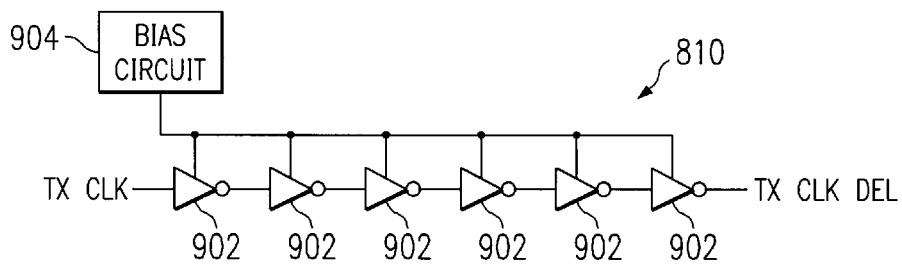
FIG. 9 illustrates a detailed diagram of the delay block.

Referring now to FIG. 9, there is illustrated a detailed diagram of the delay block 810. The delay in the delay block 810 is facilitated with a plurality of series connected inverters. In the illustrated embodiment there are provided six inverters 902 connected in series. Each of the inverters 902 is referred to as a "current starved" inverter 902. Each of the inverters 902 receives bias from a bias circuit 904. The transmit clock is received on the input of the first of the inverters 902 with the delayed transmitter clock signal output from the last of the inverters 902 for input into the multiplexer 812.

Figure 10:
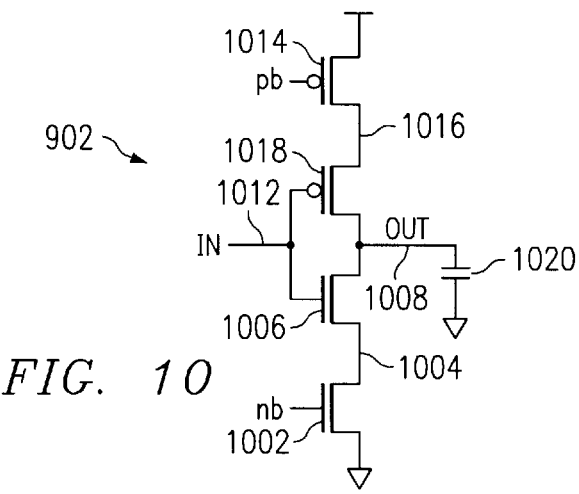
FIG. 10 illustrates a schematic of the current starved inverter.

Referring now to FIG. 10, there is illustrated a schematic of the current starved inverter 902. A first n-channel transistor 1002 has the source/drain path thereof connected between a node 1004 and ground, the gate thereof connected to a bias signal nb. A second n-channel transistor 1006 has the source/drain path thereof connected between an output node 1008 and the node 1004, the gate thereof connected to an input node 1012. A first p-channel transistor 1014 has the source/drain path thereof connected between $V_{dd}$ and a node 1016, the gate thereof connected to the bias signal pb. A second p-channel transistor 1018 has the source/drain path thereof connected between node 1016 and the output node 1008, the gate thereof connected to the input 1012. The output 1008 is illustrated as being interfaced with a capacitive load 1020, the capacitive load 1020 representing the input of the next inverter or circuitry that the delay clock is output to in the case of the last of the inverters 902.

In operation, transistors 1018 and 1006 operate as a conventional inverter, such that node 1012 going low turns on transistor 1018, and node 1012 going high turns on transistor 1006. However, once either of the transistors 1018 or 1006 are turned on, the current therethrough is limited, which current is defined by the respective transistors 1014 and 1002, which are biased to provide a limited amount of current therethrough. This current through transistors 1014 or 1002 is utilized to charge the capacitor 1020, the RC time constant associated therewith resulting in a finite rise time to the signal which will trigger the next gate when the threshold thereof is exceeded, resulting in a predefined delay. This delay can be adjusted by the amount of current that is provided by the bias, the bias signals pb and nb generated by the bias circuit 904.

Figure 11:
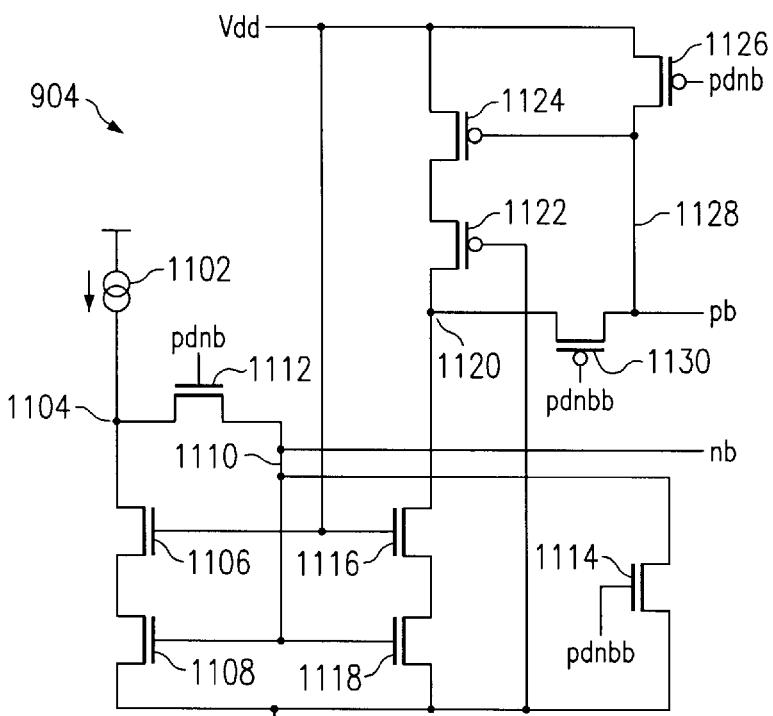
FIG. 11 illustrates a schematic of the bias circuit for the current starved inverter.

Referring now to FIG. 11, there is illustrated a schematic diagram of the bias circuit 904. A reference current source 1102 is provided which is generated outside of the bias circuit 904 but on chip. This is a temperature and process invariant current with a value of 100 μa. This current is input to a node 1104, which is input to one side of the source/drain path of an n-channel transistor 1106, the other side thereof connected to one side of the source/drain path of an n-channel transistor 1108, which has the other side thereof connected to ground. The gate of transistor 1108 is connected to a node 1110, which comprises the nb bias signal. Node 1110 is connected through the source/drain path of an n-channel transistor 1112 to the node 1104, the gate of transistor 1112 connected to the power down signal pdnb. Node 1110 is also connected through the source/drain path of an n-channel transistor 1114 to ground, the gate thereof connected to the power down signal pdnbb of the inverse of the signal pdnb. Transistor 1106 has the gate thereof connected to $V_{dd}$.

The current from current source 1102 through transistors 1106 and 1108 is mirrored to another mirror leg. This leg is comprised of two series connected n-channel transistors 1116 and 1118, transistor 1116 having the source/drain path thereof connected between the node 1120 and one side of the source/drain path of transistor 1118, the other side of the source/drain path of transistor 1118 connected to ground. The gate of transistor 1118 is connected to node 1110 and the gate of transistor 1116 is connected to $V_{dd}$. Node 1120 is connected to one side of the source/drain path of a p-channel transistor 1122, the other side thereof connected to one side of the source/drain path of a p-channel transistor 1124, the other side of source/drain path of the transistor 1124 connected to $V_{dd}$. A p-channel transistor 1126 has the source/drain path thereof connected between the $V_{dd}$ and the gate of transistor 1124 on a node 1128, the gate of transistor 1126 connected to pdnb. Node 1128 comprises the bias output signal pb. Node 1128 is connected to the gate of transistor 1124 and the gate of transistor 1122 is connected to ground. A power down p-channel transistor 1130 has the source/drain path thereof connected between node 1120 and the node 1128 to provide the pb output signal, the gate of transistor 1130 connected to the power down signal pdnbd In general, this current source will provide a 100 μa current for both the pb node 1128 and the nb node 1110.

Figure 12:
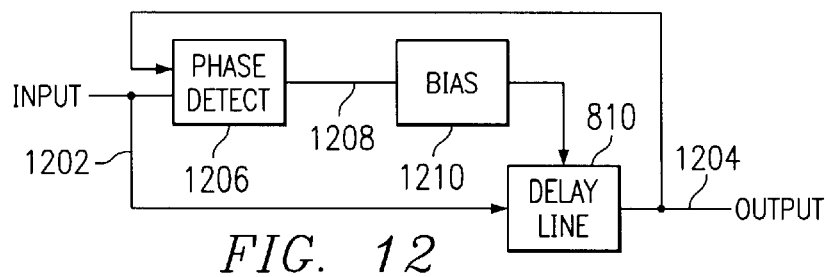
FIGS. 12–14 illustrate alternate embodiments for the delay device for the transmit clock.

Referring now to FIG. 12, there is illustrated a diagram of an alternate embodiment for the delay block 610. This embodiment utilizes the delay line 810, which was illustrated in detail in FIG. 9, with the use of the feedback phase lock operation. The input clock signal is received on a line 1202 and input to the delay line 810 and the output of the delay line 810 on a line 1204 fed back to the input of a phase detector 1206, the other input of the phase detector 1206 connected to the input. A phase difference is determined and this utilized to generate an error voltage on line 1208. The error voltage 1208 will control the bias signal provided by a bias circuit 1210, similar to the bias circuit 904, with the exception that the current provided thereto is varied. This will provide the bias to the delay line 810, which will be such that it will maintain the delay at a predetermined level, which is the result of phase detection operation. Typically, the delay will be set to 90°. Alternatively, the phase detector 1206 could merely select different taps from the delay line 810 to provide differing increments of delay.

Figure 13:
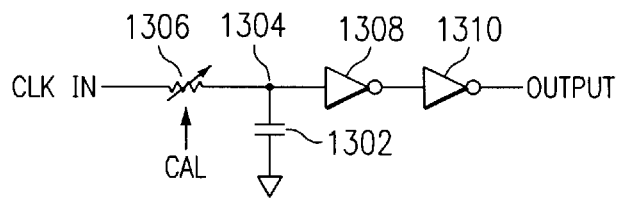

Referring now to FIG. 13, there is illustrated an alternate embodiment of the delay block 810. In this embodiment, there is provided a capacitor 1302 connected between a node 1304 and ground and a calibratable resistor 1306 connected between the clock input line and node 1304. The output of node 1304 is input to two series connected inverters 1308 and 1310 to condition and shape the output signal. The resistor 1306 is calibrated to provide the appropriate phase delay. This could be a fixed delay or it could be a delay provided by a phase detect circuit 1206 of FIG. 12. The calibrate operation is one that typically will utilize a series resistor combination of a fixed resistor and a variable resistor. The variable resistor is realized with the use of parallel connected MOS transistors which can selectively be disconnected. By determining the appropriate combination of transistors, the resistance to the source/drain path thereof can be combined to provide the desired resistance.

Figure 14:
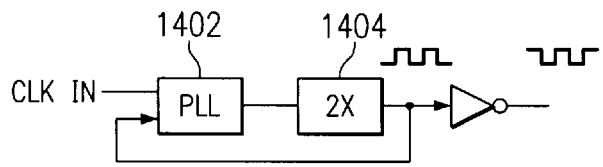

Referring now to FIG. 14, there is illustrated an alternate embodiment wherein a phase lock loop 1402 can be utilized to receive the clock input and drive a 2X clock 1404. This 2X clock can then be utilized to delay the clock by one cycle of a 2X clock. This is the technique utilized in the delay block 604, as will be described hereinbelow for the receive clock.

Figure 15:
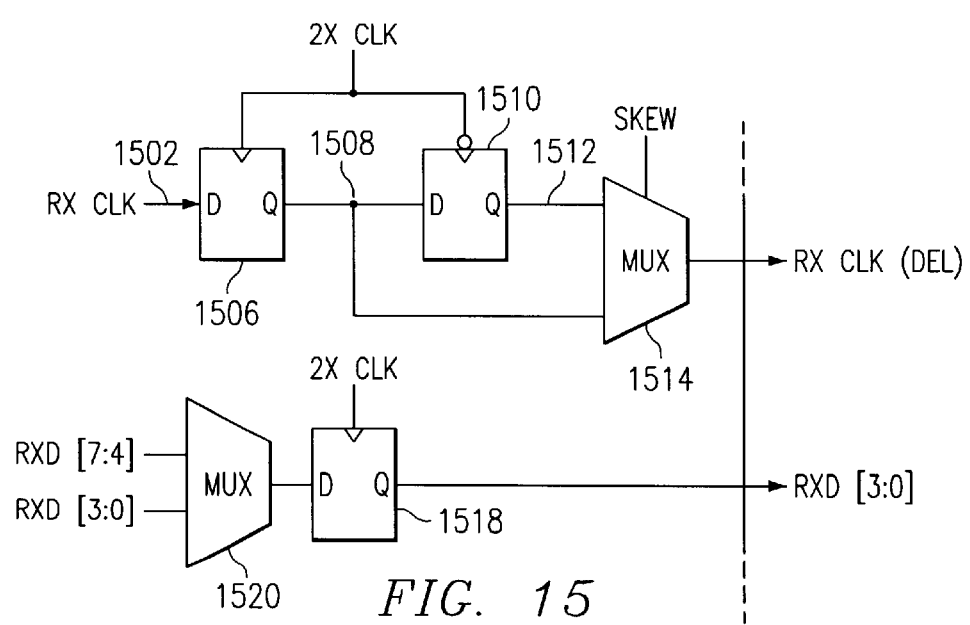
FIG. 15 illustrates a diagram for the internal timing compensation of the receive clock.

Referring now to FIG. 15, there is illustrated a diagram for the internal timing compensation of the receive clock provided by the block 602 and 604 of FIG. 6. The receive clock is generated internally and comprises a 125 MHz clock on a line 1502. This is input into the data input of a flip-flop 1506, which is clocked by an internally generated 2X clock running at a rate of 250 MHz. The output thereof will therefore have the rising edge thereof synchronized with the 2X clock on a node 1508. This is input to the data input of a flip-flop 1510 which has the clock input thereof connected to the inverted form of the 2X clock such that the flip—flip 1510 is clocked on the negative edge or falling edge of the 2X clock. This will provide a delay of one-half cycle of the 2X clock or approximately 2.0 ns for output. From the output the flip-flop on a line 1512, which is input to one input of a multiplexer 1514. The other end of the multiplexer 1514 is connected to the output of the flip-flop 1506. This other input is the bypass mode for the non-RGMII mode. The multiplexer 1514 provides a delay clock output in the RGMII mode. The multiplexer 1514 is selected by a SKEW signal.

The data path is synchronized with the rising edge of the 2X clock, keeping in mind that the RGMII operation clocks data out on the falling and the rising edge of the 125 MHz clock. Therefore, for each rising and falling edge of the 125 MHz clock common data will be output. This is facilitated with a flip-flop 1518 that is clocked by the 2X clock and receives line data input from a multiplexer 1520 either the RXD [7:4] or RXD [3:0] data. This multiplexer 1520 is controlled by the 125 MHz clock. By utilizing the 2X clock 1518, the data edge is synchronized with the clock on node 1508 or on node 1512. The output of the flip-flop 1518 provides the RXD output.

Although the preferred embodiment has been described in detail, it should be understood that various changes, substitutions and alterations can be made therein without departing from the spirit and scope of the invention as defined by the appended claims.

What is claimed is:

1. A data interface between first and second integrated circuits, comprising:
    an internal clock signal internal to the first integrated circuit and operating at a first frequency;
    a data generator for generating data from at least one edge of said internal clock for transmission to the second integrated circuit through a data output on the first integrated circuit to a data terminal; and
    a first delay block internal to the first integrated circuit for delaying said internal clock for a predetermined duration of one clock cycle of said internal clock to provide a first delayed clock through a clock output on the first integrated circuit;

wherein the second integrated circuit is operable to receive the transmitted first delayed clock on a clock input terminal thereon and utilize the transmitted first delayed clock to sample data on a data input thereon that was received from the data output of the first integrated circuit, which was generated by said data generator.

2. The data interface of claim 1, and further comprising:

a clock input on the first integrated circuit for receiving a clock signal generated internal to the second integrated circuit and transmitted therefrom;

a data input for receiving data generated internal to the second integrated circuit and transmitted therefrom, said data generated internal to the second integrated circuit synchronized with said receive clock on said clock input of the first integrated circuit; and a second delay block internal to the first integrated circuit for delaying the received clock on said clock input on the first integrated circuit by a predetermined duration of one clock cycle of said receive clock from the second integrated circuit.

3. The data interface of claim 1 wherein said data generator is operable to generate data on both the rising and the falling edges of said internal clock.

4. The data interface of claim 3, wherein the data interface is a reduced Gigabit Media Independent Interface (RGMII) type.

5. The data interface of claim 1 and wherein said first delay block comprises:

a delay clock operating at a second frequency higher than said first frequency; and delay circuitry for delaying said internal clock by a predetermined number of clock edges of said delay clock.

6. The data interface of claim 5 wherein said delay clock comprises a 2X clock that operates at said second frequency that is substantially equal to twice said first frequency.

7. The data interface of claim 6 wherein said delay circuitry is operable to delay said internal clock by one-half cycle of said 2X clock.

8. The data interface of claim 6, wherein said 2X clock is asynchronous with respect to said internal clock.

9. The data interface of claim 8, wherein said delay circuitry comprises:

a first data flip-flop for receiving said internal clock on data input thereto and clocking said received internal clock signal to an output of said flip-flop upon the rising edge of said 2X clock;

a second flip-flop for receiving the output of said first flip-flop on the data input thereof and clocking the data input thereto through to a data output on the falling edge of said 2X clock; and wherein said data generator is operable to generate data from the synchronous clock signal synchronized with the output of said first flip-flop.

10. The data interface of claim 5, wherein said predetermined number of clock edges equals substantially one fourth clock cycle of said delay clock.

11. The data interface of claim 1, wherein said predetermined duration is substantially one-fourth of one clock cycle of said internal clock.

12. A data interface between first and second integrated circuits, comprising:

a clock input on the first integrated circuit for receiving a clock signal generated internal to the second integrated circuit and transmitted therefrom;

a receive data input on the first integrated circuit for receiving data generated internal to the second integrated circuit and transmitted therefrom, said data generated internal to the second integrated circuit synchronized with said receive clock on said clock input of the first integrated circuit; and a first delay block internal to the first integrated circuit for delaying the received clock on said clock input on the first integrated circuit by a predetermined duration of one clock cycle of said receive clock from the second integrated circuit to provide a first delayed clock;

wherein said first delayed clock is utilized by the first integrated circuit to sample the data received on said receive data input.

13. The data interface of claim 12, and further comprising:

an internal clock signal internal to the first integrated circuit and operating at a first frequency;

a data generator for generating data from at least one edge of said internal clock for transmission to the second integrated circuit through a data output on the first integrated circuit to a data terminal; and a second delay block internal to the first integrated circuit for delaying said internal clock for a predetermined duration of one clock cycle of said internal clock to provide a second delayed clock through a clock output on the first integrated circuit;

wherein the second integrated circuit is operable to receive the transmitted second delayed clock on a clock input and utilize the transmitted second delayed clock to sample data on a data input thereon received from the data output of the first integrated circuit, which was generated by said data generator.

14. The data interface of claim 13 wherein said data generator is operable to generate data on both the rising and the falling edges of said internal clock.

15. The data interface of claim 14, wherein the data interface is a reduced Gigabit Media Independent Interface (RGMII) type.

16. The data interface of claim 12 and wherein said second delay block comprises:

a delay clock operating at a second frequency higher than said first frequency; and delay circuitry for delaying said internal clock by a predetermined number of clock edges of said delay clock.

17. The data interface of claim 16 wherein said delay clock comprises a 2X clock that operates at said second frequency that is substantially equal to twice said first frequency.

18. The data interface of claim 17 wherein said delay circuitry is operable to delay said internal clock by one-half cycle of said 2X clock.

19. The data interface of claim 17, wherein said 2X clock is asynchronous with respect to said internal clock.

20. The data interface of claim 19, wherein said delay circuitry comprises:

a first data flip-flop for receiving said internal clock on data input thereto and clocking said received internal clock signal to an output of said flip-flop upon the rising edge of said 2X clock;

a second flip-flop for receiving the output of said first flip-flop on the data input thereof and clocking the data input thereto through to a data output on the falling edge of said 2X clock; and wherein said data generator is operable to generate data from the synchronous clock signal synchronized with the output of said first flip-flop.

21. The data interface of claim 16, wherein said predetermined number of clock edges equals substantially one fourth clock cycle of said delay clock.

22. The data interface of claim 12, wherein said predetermined duration is substantially one-fourth of one clock cycle of said internal clock.

23. A system having at least first and second integrated circuits associated therewith, with data transferred therebetween, comprising:

an internal clock signal internal to the first integrated circuit and operating at a first frequency;

a data generator for generating data from at least one edge of said internal clock for transmission to the second integrated circuit through a data output on the first integrated circuit to a data terminal;

a data input on the second integrated circuit for receiving the data output from the first integrated circuit;

a first delay block internal to the first integrated circuit for delaying said internal clock for a predetermined duration of one clock cycle of said internal clock to provide a first delayed clock through a clock output on the first integrated circuit;

a clock input on the second integrated circuit for receiving the first delayed clock; and a sampling circuit on the second integrated circuit for utilizing the transmitted first delayed clock to sample received data on data input thereon that was received from the data output of the first integrated circuit, which was generated by said data generator.

24. The system of claim 23, and further comprising:

a clock output associated with the second integrated circuit for outputting a data clock signal generated internal to the second integrated circuit;

a data generator internal to the second integrated circuit for generating data on a data output that is synchronized to the data clock signal;

a clock input on the first integrated circuit for receiving the data clock signal generated internal to the second integrated circuit and transmitted therefrom;

a data input for receiving the data generated internal to the second integrated circuit and transmitted therefrom; and a second delay block internal to the first integrated circuit for delaying the received clock on said clock input on the first integrated circuit by a predetermined duration of one clock cycle of said received data clock signal.

25. The system of claim 24, wherein said data output on the first integrated circuit and said data input on the second integrated circuit are connected together with a first transmission line of a finite length, and said clock output on the first integrated and the clock input on the second integrated circuit connected together with a second transmission line of a length substantially equal to said finite length, and said data output on the second integrated circuit and said data input on the second integrated circuit connected together with a third transmission line of a length substantially equal to said finite length, and said data clock output on the second integrated and the clock input on the first integrated circuit connected together with a fourth transmission line of a length substantially equal to said finite length.

26. The system of claim 23, wherein said data output on the first integrated circuit and said data input on the second integrated circuit are connected together with a first transmission line of a finite length, and said clock output on the first integrated and the clock input on the second integrated circuit connected together with a second transmission line of a length substantially equal to said finite length.

27. The system of claim 23, wherein data is received on a data input to the first integrated circuit, which data received is operable to drive said data generator, such that data output by said data generator is synchronized to said first delayed clock prior to transmission to the second integrated circuit.

28. A method for interface data between first and second integrated circuits, comprising the steps of:

generating an internal clock signal internal to the first integrated circuit and operating at a first frequency;

generating data with a data generator from at least one edge of the internal clock for transmission to the second integrated circuit through a data output on the first integrated circuit to a data terminal; and delaying the internal clock with a first delay block internal to the first integrated circuit for a predetermined duration of one clock cycle of the internal clock to provide a first delayed clock through a clock output on the first integrated circuit;

wherein the second integrated circuit is operable to receive the transmitted first delayed clock on a clock input terminal thereon and utilize the transmitted first delayed clock to sample data on a data input thereon that was received from the data output of the first integrated circuit, which was generated by the data generator.

29. The method of claim 28, and further comprising:

receiving on a clock input on the first integrated circuit a clock signal generated internal to the second integrated circuit and transmitted therefrom;

receiving on a data input data generated internal to the second integrated circuit and transmitted therefrom, the data generated internal to the second integrated circuit synchronized with the receive clock on the clock input of the first integrated circuit; and delaying with a second delay block internal to the first integrated circuit the received clock on the clock input on the first integrated circuit by a predetermined duration of one clock cycle of the receive clock from the second integrated circuit.

30. The method of claim 28 wherein the step of generating with a data generator is operable to generate data on both the rising and the falling edges of the internal clock.

31. The method of claim 30, wherein the data interface is a reduced Gigabit Media Independent Interface (RGMII) type.

32. The method of claim 28 and wherein the step of delaying with the first delay block comprises the steps of:

operating a delay clock at a second frequency higher than the first frequency; and delaying with delay circuitry the internal clock by a predetermined number of clock edges of the delay clock.

33. The method of claim 32 wherein the delay clock comprises a 2X clock that operates at the second frequency that is substantially equal to twice the first frequency.

34. The method of claim 33 wherein the delay circuitry is operable to delay the internal clock by one-half cycle of the 2X clock.

35. The method of claim 33, wherein the 2X clock is asynchronous with respect to the internal clock.

36. The method of claim 35, wherein the step of delaying with the delay circuitry comprises the step of:
receiving the internal clock on the data input of a first data flip-flop and clocking the received internal clock signal to an output of the flip-flop upon the rising edge of the 2X clock;
receiving the output of the first flip-flop on the data input of a second flip-flop and clocking the data input thereto through to a data output on the falling edge of the 2X clock; and
wherein the data generator is operable to generate data from the synchronous clock signal synchronized with the output of the first flip-flop.

37. The method of claim 32, wherein the predetermined number of clock edges equals substantially one fourth clock cycle of the delay clock.

38. The method of claim 28, wherein the predetermined duration is substantially one-fourth of one clock cycle of the internal clock.

39. A method for interfacing between first and second integrated circuits, comprising:
receiving on a clock input on the first integrated circuit a clock signal generated internal to the second integrated circuit and transmitted therefrom;
receiving on a receive data input on the first integrated circuit data generated internal to the second integrated circuit and transmitted therefrom, the data generated internal to the second integrated circuit synchronized with the receive clock on the clock input of the first integrated circuit; and
delaying with a first delay block internal to the first integrated circuit the received clock on the clock input on the first integrated circuit by a predetermined duration of one clock cycle of the receive clock from the second integrated circuit to provide a first delayed clock;
wherein the first delayed clock is utilized by the first integrated circuit to sample the data received on the receive data input.

40. The method of claim 39, and further comprising:
providing an internal clock signal internal to the first integrated circuit and operating at a first frequency;
generating data with a data generator from at least one edge of the internal clock for transmission to the second integrated circuit through a data output on the first integrated circuit to a data terminal; and
delaying with a second delay block internal to the first integrated circuit the internal clock for a predetermined duration of one clock cycle of the internal clock to provide a second delayed clock through a clock output on the first integrated circuit;
wherein the second integrated circuit is operable to receive the transmitted second delayed clock on a clock input and utilize the transmitted second delayed clock to sample data on a data input thereon received from the data output of the first integrated circuit, which was generated by the data generator.

41. The method of claim 40 wherein the step of generating with the data generator is operable to generate data on both the rising and the falling edges of the internal clock.

42. The method of claim 41, wherein the interface is effected with a reduced Gigabit Media Independent Interface (RGMII) type.

43. The method of claim 39 and wherein the step of delaying with the second delay block comprises the steps of:
providing a delay clock operating at a second frequency higher than the first frequency; and
delaying with delay circuitry the internal clock by a predetermined number of clock edges of the delay clock.

44. The method of claim 43 wherein the delay clock comprises a 2X clock that operates at the second frequency that is substantially equal to twice the first frequency.

45. The method of claim 44 wherein the delay circuitry is operable to delay the internal clock by one-half cycle of the 2X clock.

46. The method of claim 45, wherein the 2X clock is asynchronous with respect to the internal clock.

47. The method of claim 46, wherein the step of delaying with the delay circuitry comprises:
receiving the internal clock on the data input of a first data flip-flop and clocking the received internal clock signal to an output of the flip-flop upon the rising edge of the 2X clock;
receiving the output of the first flip-flop on the data input of a second flip-flop thereof and clocking the data input thereto through to a data output on the falling edge of the 2X clock; and
wherein the data generator is operable to generate data from the synchronous clock signal synchronized with the output of the first flip-flop.

48. The method of claim 43, wherein the predetermined number of clock edges equals substantially one fourth clock cycle of the delay clock.

49. The method of claim 39, wherein the predetermined duration is substantially one-fourth of one clock cycle of the internal clock.

50. A method for interfacing first and second integrated circuits for data transfer therebetween, comprising the steps of:
generating an internal clock signal internal to the first integrated circuit and operating at a first frequency;
generating data with a data generator from at least one edge of the internal clock for transmission to the second integrated circuit through a data output on the first integrated circuit to a data terminal;
receiving on a data input on the second integrated circuit the data output from the first integrated circuit;
delaying with a first delay block internal to the first integrated circuit the internal clock for a predetermined duration of one clock cycle of the internal clock to provide a first delayed clock through a clock output on the first integrated circuit;
receiving the first delayed clock on a clock input on the second integrated circuit; and
sampling the received data on the data input to the second integrated circuit that was received from the data output of the first integrated circuit with the transmitted first delayed clock.

51. The system of claim 50, and further comprising the steps of:
outputting a data clock signal on a clock output associated with the second integrated circuit and generated internal to the second integrated circuit;
generating data on a data output with a data generator internal to the second integrated circuit, which data is synchronized to the data clock signal;
receiving on a clock input on the first integrated circuit the data clock signal generated internal to the second integrated circuit and transmitted therefrom;

receiving on a data input the data generated internal to the second integrated circuit and transmitted therefrom; and delaying with a second delay block internal to the first integrated circuit the received clock on the clock input on the first integrated circuit by a predetermined duration of one clock cycle of the received data clock signal.

* * * * *